Patented May 9, 1933

1,907,782

UNITED STATES PATENT OFFICE

JOHN M. GAINES, JR., OF CAMBRIDGE, MASSACHUSETTS

PROCESS FOR MAKING STEEL

No Drawing.   Application filed December 21, 1929.   Serial No. 415,793.

The present invention relates to a process for making steel.

The object of the present invention is to provide an improved method for refining steel to produce efficiently and at comparatively low cost a high grade of steel which will be relatively free from the inclusions and similar defects ordinarily found in steel made under present methods.

The refining process in making steel consists in melting the raw metal and in lowering the percentages of carbon and other impurities such as phosphorus and sulphur to within desired limits. The reduction of the amount of carbon is accomplished by means of oxidizing agents which combine with the carbon in the metal to form carbon monoxide and dioxide gas which is evolved as a bubble and passes off from the bath.

As the process is ordinarily carried out by the basic open hearth method, raw material consisting of pig iron, scrap, and sometimes iron ore is charged into the furnace, together with limestone as a flux. When melted, the iron will contain from one-half to two per cent of carbon while the bulk of the other impurities will have become incorporated, with lime from the limestone, into a slag, which floats in a liquid condition above the metal. In order to reduce the carbon to the desired extent, an oxidizing agent is added in the form of iron ore which is converted into iron oxide and dissolves through the medium of the slag into the metal. The predominant reaction takes place as follows:—

$$FeO + C = Fe + CO$$

and the CO is evolved as a gas bubble.

In consequence of the well-known chemical law of mass action, an excess of iron oxide is necessary to cause the reaction to proceed. Furthermore, as the carbon content becomes lower, proportionately more iron oxide must be present in order to maintain an economical rate of elimination of the carbon. It is normal for steel with 0.10% of carbon to contain 0.25% of iron oxide during the refining period.

After the amount of carbon in the steel has been reduced to the desired per cent, the steel is de-oxidized by the addition of some metal or metals such as aluminum, silicon, or manganese, which are added to the bath and combine with the oxides of iron, giving a small globule of alumina or silica, and removing the iron oxide from the molten metal.

The defect of this process is that the small globules of silica, alumina, or other complex de-oxidation products, do not escape entirely but to a considerable degree are entrapped in the steel and appear in the ingot or finished product. They are a serious source of surface defects, as well as a cause of reduction in tensile strength and ductility.

Speaking more broadly, it is true that in any process of refining steel which proceeds by burning or oxidizing the impurities from the bath of molten metal, there will necessarily be present in the bath both carbon and iron oxide. In the open hearth process, the iron oxide is introduced as an oxidizing agent to reduce the amount of carbon. In such a process as the Bessemer process, where air is utilized as the oxidizing agent, iron oxide will be present due to the action of the oxygen on the molten iron.

The present invention contemplates the provision of a method of refining the steel which will permit a reduction in the amount of the oxidizing agent in the steel near the end of the refining process and thereby decrease or entirely eliminate the inclusions which are necessarily formed as a result of the de-oxidation of the steel at the end of the refining process.

It is proposed, in the present instance, to eliminate the iron oxide from the molten metal by utilizing the carbon in the steel as the de-oxidizing agent, and to control the reaction between the carbon and iron oxide in such a manner that, as the carbon content in the metal is brought to the required per cent, the amount of iron oxide present in the metal will simultaneously be brought down to a very low or insignificant value. Carbon is admittedly an excellent de-oxidizer. Furthermore, its reaction product is a gas, a fact which makes it particularly valuable for the present purpose since obviously there will be no damaging de-oxidation products left as inclusions in the steel.

While it is theoretically possible to cause the carbon in the bath to combine with all of the iron oxide present to simultaneously de-carburize and de-oxidize the steel, such a result has never been attained in practice, due to the fact that as the percentage of carbon and iron oxide in the steel are reduced, the reaction inevitably slows down and the formation of gaseous oxides of carbon with the evolution of gas bubbles and the consequent boil will have ceased. The elimination of the carbon in the absence of a boil takes place by diffusion and evaporation at an exceedingly slow rate. In order, therefore, to maintain a rate of elimination of carbon which will make the reaction commercially practicable, it has been found necessary to maintain a large excess of the oxidizing agent, and after the carbon content of the steel has been reduced to the desired amount, to de-oxidize the molten metal.

The cessation of the evolution of the bubbles with the consequent boil is due to the conditions in the molten metal under which the gas bubbles are formed, and more particularly, to the resistance offered by the very high surface tension of the molten iron. These bubbles are formed in the molten metal under a very large initial pressure which, so far as can be inferred from the most recent experimental data, is in the neighborhood of 20 atmospheres.

In carrying out the method herein disclosed, the oxidation process is carried out in the usual manner in the presence of an excess of the oxidizing agent to maintain a rapid rate of elimination of the carbon until very nearly the required per cent of carbon is left in the steel. At this point, however, the supply of oxidizing agent to the molten metal is cut off, and a catalytic agent is introduced which acts by overcoming the high surface tension of the iron to permit the continuance of the reaction between the carbon and the oxides of iron present at a comparatively rapid rate with the evolution of bubbles composed of the gaseous oxides of carbon. The excess of carbon remaining in the steel is thus used to de-oxidize the steel at least partially while at the same time, the content of carbon is reduced to within the desired limits. In order to completely de-oxidize the steel within a reasonable time, it may be necessary to add a small amount of de-oxidizing agent in the usual manner.

The process of removing the iron oxide from the metal as carried out in connection with the basic open hearth process for making steel is described as follows:—After the oxidation process to de-carburize the metal has proceeded almost to completion, in the usual manner, through the agency of a slag containing a large excess of iron oxide, the supply of iron oxide to the metal from the slag is cut off so that no further external oxidizing action can take place on the metal. This result may be accomplished either by replacing the iron oxide bearing slag with an inert slag which may consist of a mixture of lime, silica and alumina, in such proportion as to flow readily and not to attack unduly the refractories of the furnace, or by rendering the slag inactive by the addition of thickening agents such as lime or dolomite. The oxidation process is preferably halted, as above described, at a point where there still remains in the metal a slight excess of carbon which is sufficient to reduce to a very low value the amount of the oxides of iron remaining in the steel.

A rapid de-oxidation of the molten metal by means of the carbon present is now produced by the introduction of a catalytic agent which is calculated as above described to overcome the extremely high surface tension of the molten metal and allow bubbles composed of the gaseous oxides of carbon to form. The desired effect is preferably secured by stirring the metal with a steel rod to produce a vigorous boil as the gas is liberated by contact with the solid surface of the rod. Similarly, other solid objects such as bricks, lumps of pig iron, or washed metal may be introduced into the bath or an inert gas such as nitrogen may be forced through the molten metal in a manner similar to blowing in a Bessemer converter to secure the desired speeding up of the reaction. Alternatively hollow tubes, instead of rods, may be used to allow a simultaneous stirring and blowing of nitrogen through the metal. These agents, as will be evident from the above description, have a mechanical as opposed to a chemical action in speeding up the reaction to form bubbles of carbon monoxide gas by forming surfaces within the bath which may be described as surfaces of discontinuity. The efficiency of the particular agent employed depends upon the number of such surfaces which are formed, an ideal condition being obtained only when every particle of the metal within the bath has become at one time or another a part of such a surface or, in other words, has been brought in contact with the solid objects or bubbles of inert gas introduced into the bath.

If the carbon content in the steel is found to be below the specifications, washed metal or graphite bars can be used to catalyze the reaction causing the content of carbon in the molten metal at the same time to be brought up to the required per cent.

As a final step in the process, it may be necessary to put a small amount of the usual de-oxidizing agents into the molten metal to complete the de-oxidation process. The amount of the damaging de-oxidation products which will be formed in this manner and retained in the steel in the form of inclusions will, however, be relatively so small as to be quite negligible.

A similar reaction to remove the iron oxide from the molten metal without introducing separate de-oxidizing agents may be obtained in the Bessemer process by shutting off the supply of air which is blown through the metal at the desired stage, placing a neutral slag over the metal to produce the required reducing atmosphere, and thereafter blowing nitrogen gas through the metal to complete the reaction between the carbon and iron oxide present to simultaneously de-oxidize and de-carburize the steel.

By the use of the process herein disclosed, a steel of very high quality is produced at low cost which is relatively or entirely free from the inclusions usually found in the finished product. A considerable saving in the cost of manufacture is effected due to the reduced expense of chipping and otherwise preparing the steel for rolling and due also to the elimination or reduction in the use of the necessarily expensive ingredients employed in the de-oxidation process. In the manufacture of rimming steel, which is incompletely de-oxidized in the bath and consequently evolves large amounts of gas on solidification, the use of the present method of de-oxidizing eliminates entirely the usual additions of expensive manganese and aluminum. In the manufacture of killed or completely de-oxidized steels, a substantial decrease in the amount of de-oxidizing agents required is effected and the quantity of inclusions in the finished product substantially reduced.

The invention having been described, what is claimed is:

1. The method of reducing the carbon content of molten iron to produce steel in a Bessemer or open hearth furnace which comprises subjecting the molten metal to the action of an oxidizing agent to cause the liberation of gaseous oxides of carbon, preventing the access of further oxidizing agents to the molten metal with a slight excess of carbon still remaining in the metal and a substantially equivalent excess of oxygen to combine with and reduce the carbon and oxygen content of the steel to within desired limits, and thereafter while maintaining the heat at the usual working temperature introducing a catalytic agent to produce within the steel surfaces of discontinuity to accelerate reaction between the carbon and the oxidizing agent present in the molten metal to de-carburize and de-oxidize the steel within desired limits.

2. The method of reducing the carbon content of molten iron to produce steel in a Bessemer or open hearth furnace which comprises subjecting the molten metal to the action of an oxidizing agent to cause the liberation of gaseous oxides of carbon, preventing the access of further oxidizing agents to the molten metal with a slight excess of carbon still remaining in the metal and a substantially equivalent excess of oxygen to combine with and reduce the carbon and oxygen content of the steel to within desired limits, thereafter while maintaining the heat at the usual working temperature introducing a catalytic agent comprising bubbles of an inert gas to produce within the steel surfaces of discontinuity to accelerate reaction between the carbon and the oxidizing agent present in the molten metal to simultaneously de-carburize and de-oxidize the steel, and adding a de-oxidizing agent to complete the de-oxidation process.

3. The method of reducing the carbon content of molten iron to produce steel in a Bessemer or open hearth furnace which comprises subjecting the molten metal to the action of an oxidizing agent comprising iron oxide to cause the liberation of gaseous oxides of carbon, preventing further access of the said oxidizing agent to the molten metal with a slight excess of carbon still remaining in the metal and a substantially equivalent excess of oxygen to combine with and reduce the carbon and oxygen content of the steel to within desired limits, and thereafter while maintaining the heat at the usual working temperature introducing a catalytic agent to produce within the steel surfaces of discontinuity to accelerate the reaction between the carbon and the said oxidizing agent present in the molten metal to de-carburize and de-oxidize the steel within the desired limits.

4. The method of reducing the carbon content of molten iron to produce steel in a Bessemer or open hearth furnace which comprises the evolution of gaseous oxides of carbon from the metal by the introduction of an oxidizing agent to cause the liberation of gaseous oxides of carbon, providing an inert slag to arrest the de-carburizing process with a slight excess of carbon still remaining in the metal and a substantially equivalent excess of oxygen to combine with and reduce the carbon and oxygen content of the steel to within desired limits, and thereafter while maintaining the heat at the usual working temperature introducing a catalytic agent to produce within the steel surfaces of discontinuity to accelerate the reaction between the carbon and the said oxidizing agent remaining in the metal to de-oxidize the steel.

5. The method of reducing the carbon content of molten iron to produce steel in a Bessemer or open hearth furnace which comprises the evolution of gaseous oxides of carbon from the molten iron by the introduction of an oxidizing agent to cause the liberation of gaseous oxides of carbon, providing an inert slag to prevent further access of oxidizing agents to the molten metal with a slight excess of carbon remaining in the steel and a substantially equivalent excess of oxygen to combine with and reduce the carbon and oxygen content of the steel to within desired limits, and thereafter while maintaining the heat at the usual working temperature introducing solid objects into the bath to accelerate the reaction between the said carbon and oxides of iron to de-carburize and de-oxidize the steel.

6. The method of reducing the carbon content of molten iron which comprises subjecting the molten metal to the action of an oxidizing agent comprising iron oxide to cause the liberation of gaseous oxides of carbon, preventing the further access of oxidizing agents to the molten metal with a slight excess of carbon remaining in the metal, and thereafter accelerating the reaction between the carbon and the said oxidizing agent remaining in the metal by introducing solid objects and blowing inert gas through the molten metal.

7. The method of reducing the carbon content of molten iron which comprises subjecting the molten metal to the action of an oxidizing agent to cause the liberation of gaseous oxides of carbon, substantially preventing the access of further oxidizing agents to the molten metal with a slight excess of carbon still remaining in the metal and a substantially equivalent excess of oxygen to combine with and reduce the carbon and oxygen content of the steel to within desired limits, and thereafter while maintaining the heat at the usual working temperature producing within the metal surfaces of discontinuity to accelerate reaction between the carbon and the oxidizing agent present in the molten metal to decarburize and deoxidize the steel within the desired limits.

8. The method of reducing the carbon content of molten iron to produce steel which comprises the evolution of gaseous oxides of carbon from the molten metal by the introduction of a slag containing an excess of the oxides of iron, preventing the access of further oxidizing agents to the molten metal with a slight excess of carbon still remaining in the metal and a substantially equivalent excess of oxygen to combine with and reduce the carbon and oxygen content of the steel to within desired limits, and thereafter blowing inert gas through the molten metal to accelerate the reaction between the said carbon and oxides of iron to decarburize and deoxidize the steel.

9. The method of reducing the carbon content of molten iron in a Bessemer converter which comprises subjecting the molten metal to the action of a blast of air, suspending said process with a slight excess of carbon still remaining in the metal and a substantially equivalent excess of oxygen to combine with and reduce the carbon and oxygen content of the steel to within desired limits and thereafter subjecting the molten metal to a blast of inert gas to accelerate the reaction between the said carbon and oxides of iron present in the metal to decarburize and deoxidize the metal within desired limits.

10. The method of reducing the carbon content of molten iron which comprises subjecting the molten metal to the action of an oxidizing agent to cause the liberation of gaseous oxides of carbon, substantially preventing the access of further oxidizing agents to the molten metal with a slight excess of carbon still remaining in the metal, and a substantially equivalent excess of oxygen to combine with and reduce the carbon and oxygen content of the steel to within desired limits, thereafter while maintaining the bath at the usual working temperature, producing within the metal surfaces of discontinuity to accelerate reaction between the carbon and the oxidizing agent present in the molten metal to de-carburize and de-oxidize the steel within the desired limits, and adding a de-oxidizing agent to complete the de-oxidization process.

In testimony whereof I have signed my name to this specification.

JOHN M. GAINES, Jr.